US006693886B1

United States Patent
Haikonen et al.

(10) Patent No.: US 6,693,886 B1
(45) Date of Patent: Feb. 17, 2004

(54) METHOD AND APPARATUS FOR CONDUCTING MOBILE COMMUNICATION OVER IP NETWORKS

(75) Inventors: Janne Haikonen, Tampere (FI); Peeter Pruuden, Tampere (FI)

(73) Assignee: Nokia IP, Inc., Mountain View, CA (US)

( * ) Notice: Subject to any disclaimer, the term of this patent is extended or adjusted under 35 U.S.C. 154(b) by 0 days.

(21) Appl. No.: 09/498,643

(22) Filed: Feb. 7, 2000

(51) Int. Cl.[7] .................................................. H04Q 7/24
(52) U.S. Cl. ...................... 370/338; 370/467; 370/352; 455/439; 455/517; 709/227; 709/228
(58) Field of Search ................................. 709/227, 228; 455/515, 517, 439, 560, 426; 370/329, 338, 401, 466, 467, 328, 400, 352, 354, 356

(56) References Cited

U.S. PATENT DOCUMENTS

| | | | | |
|---|---|---|---|---|
| 5,590,133 A | * | 12/1996 | Billstrom et al. ........... 370/349 |
| 5,628,051 A | * | 5/1997 | Salin .......................... 455/433 |
| 6,222,829 B1 | * | 4/2001 | Karlsson et al. ............. 370/329 |
| 6,304,564 B1 | * | 10/2001 | Monin et al. ................ 370/338 |
| 6,304,753 B1 | * | 10/2001 | Hartmaier ................... 455/413 |
| 6,317,607 B1 | * | 11/2001 | Tomcik et al. .............. 455/552 |
| 6,324,279 B1 | * | 11/2001 | Kalmanek et al. .......... 379/229 |
| 6,327,267 B1 | * | 12/2001 | Valentine et al. ........... 370/466 |
| 6,353,607 B1 | * | 3/2002 | Valentine et al. ........... 370/349 |
| 6,370,132 B1 | * | 4/2002 | Saxena ........................ 370/338 |
| 6,400,950 B1 | * | 6/2002 | Patel et al. .................. 455/435 |
| 6,426,955 B1 | * | 7/2002 | Gossett Dalton et al. ... 370/401 |
| 6,430,176 B1 | * | 8/2002 | Christie, IV ................ 370/355 |
| 6,434,139 B1 | * | 8/2002 | Liu et al. .................... 370/352 |
| 6,466,571 B1 | * | 10/2002 | Dynarski et al. ........... 370/352 |
| 6,477,366 B1 | * | 11/2002 | Valentine et al. ........... 455/416 |
| 6,487,602 B1 | * | 11/2002 | Thakker ...................... 709/230 |
| 6,490,451 B1 | * | 12/2002 | Denman et al. ............. 455/436 |
| 6,512,754 B2 | * | 1/2003 | Feder et al. ................. 370/338 |
| 6,515,997 B1 | * | 2/2003 | Feltner et al. .............. 370/401 |
| 2002/0015392 A1 | * | 2/2002 | Musikka et al. ............ 370/331 |

* cited by examiner

Primary Examiner—Huy D. Vu
Assistant Examiner—Michael Molinari
(74) Attorney, Agent, or Firm—Antonelli, Terry, Stout & Kraus, LLP (57) ABSTRACT

A method and apparatus for permitting mobile communications between a Mobile Services Switching Center (MSC) and a Mobile Station (MS) and between MSs by establishing for each transaction, including a call, an Internet Protocol (IP) connection in an IP network. In the invention a call to a MS is initiated by sending from the MSC to the MS, via the IP network, a call initiation message causing the MS to send a response message which includes a mobile identity that can be used as a session identifier identifying the MS. Responsive to the response message, the MSC sends a call set up message to establish an IP connection in the IP network upon which a transaction including the call is to be conducted. The call set up message includes a transaction ID which identifies the transaction. The IP network stores the transaction ID and maps the transaction ID with respect to the session identifier and the IP connection to be established. The IP connection is established in the IP network according to data stored and mapped in the IP network. Another call to the MS from another MS, while the previous call is active, is handled by establishing another IP connection and mapping a different value for the transaction ID for the other call for at least a second leg of the other IP connection to avoid clashes with the previously mapped transaction ID.

20 Claims, 7 Drawing Sheets

METHOD AND APPARATUS FOR CONDUCTING MOBILE COMMUNICATION OVER IP NETWORKS

BACKGROUND OF THE INVENTION

The present invention relates to conducting communications over packet-switched networks such as Internet Protocol (IP) networks. More particularly, the present invention relates to conducting mobile communications over IP networks.

Voice or telephony services can now be provided over packet-switched networks, such as the Internet. These packet-switched networks are commonly referred to as IP networks, IP telephony networks or Voice over IP (VoIP) networks because the Internet Protocol according to various IP based standards is the primary protocol used. One such IP based standard, for example, is the International Telecommunication Union (ITU) H.323 Standard.

The H.323 Standard provides a foundation for audio, video, and data communications across IP networks. By complying with the H.323 Standard, multimedia products and applications from multiple vendors can interoperate, allowing users to communication without concern for compatibility. The H.323 Standard is part of a larger series of communications standards that enable audio video conferencing across a range of networks.

The H.323 Standard defines four major components for network based communications, namely, terminals, Gateways (GW) Gatekeepers (GK) and Multipoint Control Units (MCU).

Terminals are the client endpoints on the network that provide realtime two-way communications. All terminals which comply with the H.323 standard must also support the ITU H.245 Standard, which is used to negotiate channel usage and capabilities. Further, terminals which comply with the H.323 standard are required to implement the ITU Q.931 and the H.225 standards for call signaling and call setup, including for example, Registration/Admission/Status (RAS) processing. Optional capabilities in terminals which comply with the H.323 standard are MCU capabilities.

A gateway is an optional element when implementing the H.323 standard. Each gateway provides many services the most common being a translation function between the H.323 standard conferencing endpoints and other terminal types. Each gatekeeper acts as a central point for all calls or communications within a zone serviced by the gatekeeper and provides call communication control services to registered endpoints. The gatekeeper could be considered a virtual switch. The MCU supports conferences between three or more endpoints.

Each of the above described endpoints, GW, GK, and MCU can be implemented by use of apparatus such as a personal computer (PC), workstation, server, etc.

The above described H.323 standard as defined is intended to operate in fixed packet-switched networks where the endpoints, for example, terminals such as workstations, PC's, etc., that conform to the H.323 standard, do not move to a new zone serviced by another gatekeeper. Further, packet-switched networks defined according to the above described H.323 standard are not intended to accommodate the communications (i.e., message signaling) between a Mobile Station (MS) and a Mobile Services Switching Center (MSC). Such message signaling is defined according to e.g., the GSM or the Code Division Multiple Access (CDMA) standards.

In a typical mobile system (e.g., GSM), the signaling between each MS and the MSC is based on circuit switched connectivity, (e.g., in GSM system Signaling Connection Control Part (SCCP)/Link Access Protocol on the D-Channel (LAPD)/Link Access Protocol on the Dm-Channel Message (LAPDm) connectivity that is achieved by using dedicated timeslots in A- and Abis-interfaces). Since a timeslot based circuit switched connectivity model is used, there usually is not any addressing information present in signaling messages. The timeslot itself, is sufficient for addressing the circuit switched connection to the MS. Also, whenever there are more than one simultaneous logical signaling connection between the MSC and one MS, all of these logical connection transactions use the same circuit switched connection for signaling needs. The different logical connections are distinguished by Protocol Discriminator and Transaction Identifier (TI) parameters. For call control purposes the two first parameters are always the same, but the TI distinguishes between two (or more) logical call control sessions. Such as, for example, where one call is active and another is on hold. It should be noted that each TI must be unique for the MS.

IP telephony networks, on the other hand, do not rely on timeslot-based circuit switched connectivity. In H.323 based telephony networks the signaling is done using H.225.0 standard call control messages that provide logical call identifier and are transmitted over Internet Protocol (IP) connections. An IP telephony network may prefer a centralized signaling model, in which signaling messages, between endpoints A and B are routed through the logical switch (e.g., GK or Call Processing Server (CPS)). For Example, each connection between endpoints A and B according to the Q.931 standard includes A-GK and GK-B legs. Each connection is distinguished by a Call Identifier (ID). The same Call ID is used for both legs of the end-to-end connection.

Since in a mobility aware IP telephony network it is possible that one transaction is external (controlled the by MSC) and another internal (controlled by the GK), there is a strong possibility that TIs used for these transactions may clash. This can occur due to the fact that the MSC is not aware of the internal call transactions. An external call is one that is signaled through the network gateway (NW-GW) and possibly controlled by an external switch such as the MSC. An internal call on the other hand is one that is signaled entirely within the IP telephony network or a sub-network thereof (except with respect to the radio interface) and is controlled by the logical switch of the sub-network such as the GK.

Two alternatives have been proposed to solve the above noted problems.

The first alternative provides only one IP telephony call control connection per active MS and then tunnels simultaneous mobile (cellular) call control messages inside that same IP telephony call control connection. Thus, mapping is performed only between mobile identity which corresponds to circuit switched connectivity, and the IP telephony call control connection. Such is performed without taking the TI into consideration, except for performing TI reallocation when TI clashes occurs.

The second alternative provides for the opening of one "raw" IP connection per active MS and then tunneling all IP telephony call control messages through the one "raw" IP connection.

The above described first alternative has one clear benefit, in that handover is easier since only one IP telephony call control connection needs to be re-routed. However, a disadvantage of the first alternative is that support of supplementary services is virtually impossible. Since the same Call ID namely, the same IP telephony call control connection, is used for all calls per MS, then it would be very hard to make call transfers for any individual call. Also, the first alternative may easily lead to situations where the Call ID isn't end-to-end anymore. Namely, the Network Gatway (NW-GW)-GK leg and GK-Radio Access Gateway (RA-GW) leg of the same call may have different Call ID's. This increases the complexity of the GK.

The second alternative has some advantages, the handover is easier since only one IP telephony call control connection needs to be re-routed. The second alternative also allows for supplementary services support. However, neither alternative is H.323 standard compliant and therefore they do not suit well to an IP telephony network.

To solve the above mentioned TI clashes between internal and external calls, the above described alternatives propose that the GK change the TI value of the external call in such a way that the MSC notices no change. Namely, towards the MSC the GK uses the TI value allocated by the MSC and towards the MS the GK uses some other TI value such as 2.

The above solution however has one major disadvantage. Since the MSC and the MS are not aware of the change of the TI value in the GK, the handover from the IP telephony network to an external network cannot be performed. This is because after the handover, the TI translation functionality of the GK would be removed from the connection thus leaving the MSC and the MS using different TI values for the same transaction. These handovers can only be performed for external call transactions, since the internal call transactions are not known to the MSC. However, these kinds of handovers are possible after the internal call has been released. It should be noted that handovers out of the IP telephony network, while an internal call is happening, is not possible anyway.

Thus, a solution is required for mapping IP telephony call control signaling connections (and Call IDs) to timeslots and TIs of the mobile (cellular) network signaling connections. Particularly, a solution is required which permits more than one transaction (sessions) to be conducted for each MS.

SUMMARY OF THE INVENTION

The present invention provides a method and apparatus that permits mobile communications to be conducted over packet-switched networks. Specifically, the present invention provides a method and apparatus for accommodating signaling between a MS and a MSC over an IP network where a new IP telephony signaling connection (e.g., Q931 connection in case of H.323 system) is opened for each transaction.

Specifically, the method and apparatus of the present invention permits mobile communications between a Mobile Switching Center (MSC) and a Mobile Station (MS) and between MSs by establishing for each transaction including a call on an Internet Protocol (IP) connection in an IP network. It should be noted that the present invention is not limited to cases where the first transaction is a mobile terminated external call. Other types of transactions being the first transaction can initiate the procedures of the present invention. The mobile terminated call as the first transaction as described below is, for example, purposes only.

Thus, for example, in the invention a call to a MS is initiated by sending from the MSC to the MS, via the IP network, a (call initiation e.g., paging) message causing the MS to send a response message to the MSC. The response message includes a mobile identity which identifies the MS. Responsive to the response message, the MSC sends to the MS a call set up message that triggers establishment of an IP connection in the IP network upon which a transaction including the call is to be conducted. The call set up message includes a transaction ID which identifies the transaction. The IP network stores the transaction ID from the call setup message, and maps the transaction ID with respect to the mobile identity and the IP connection to be established. The IP connection is established in the IP network according to data stored and mapped in the IP network, thereby permitting mobile communications between the MSC and the MS over the IP network. Another call to the MS from another MS while the previous call is active is handled by establishing another IP telephony signaling connection in the IP network for the other call and mapping a different value for the transaction ID for the other call with respect to the mobile identity of the other MS and a second leg of the other IP connection to be established between said IP network and the MS in a manner to avoid clashes with the previously mapped transaction ID.

With respect to mobile (cellular) systems, the present invention provides for mapping circuit switched connections (e.g., SCCP and LAPD in GSM system) and TI to IP telephony signaling connections (Call IDs). In the present invention, the GK is responsible for solving TI clashes by he reallocating new TIs for those that would otherwise clash with existing ones.

In mobile (cellular) systems, the MS is not usually addressed due to the circuit switched nature of the signaling connection. Therefore, in order to address the MS with an IP telephony signaling message the present invention provides a method and apparatus using a mobile identity (e.g., in GSM, the Temporary Mobile Subscriber Identification/International Mobile Subscriber Identification (TMSI/IMSI), or International Mobile Equipment Identification (IMEI) in case of emergency calls initiated from a MS that has no Subscriber Identity Module (SIM)), as a session ID that uniquely addresses the MS.

Alternatively to the procedure of the present invention described above, where a new IP telephony signaling connection is opened for each transaction, the present invention also provides a procedure where only one Q931 signaling connection is established for each active MS regardless of the number of non-idle call control transactions the MS is involved in.

Further, the present invention provides a procedure where the GK allocates TI values using the highest unused value.

BRIEF DESCRIPTION OF THE DRAWINGS

The present invention will be more apparent from the following detailed description, when taken in conjunction with the accompanying drawings, in which.

DETAILED DESCRIPTION OF THE INVENTION

The present invention relates to the field of telecommunications/IP telephony. More particularly, the present invention relates to supporting mobile cellular system (e.g., GSM) message signaling in packet-switched (e.g., IP) networks constructed according to the IP telephony (e.g., H.323) standard.

The present invention provides a method and apparatus its for supporting mobile cellular system (e.g., GSM) message signaling in IP networks constructed according to the IP telephony (e.g., H.323) standard. In a mobile cellular system (e.g., GSM system), message signaling between a MS and a MSC is based on circuit switched (e.g., SCCP/LAPD/LAPDm) connectivity. An IP telephony network does not rely on circuit switched connectivity. In an IP telephony network, the message signaling is conducted using call control messages according to the IP telephony (e.g., H.225) standard and such messages are transmitted over the IP telephony network using IP connections.

According to the method and apparatus of the present invention, a new message signaling connection according to the IP telephony call control standard (e.g., H.225.0) is opened for each transaction. The present invention provides mapping of circuit switched connections, namely SCCP, LAPD and TI, to Call ID according to the Q931 standard. The GK is responsible for solving TI clashes by reallocating new TIs for those that would otherwise clash with the existing TIs.

In the present invention, each call control transaction is signaled using a separate signaling connection according to the IP telephony call control (e.g., H.225.0) standard inside the IP telephony network. The present invention is particularly applicable to a case where more than one non-idle transaction (each having a separate TI) is established for the same MS, and the non-idle transactions are signaled using the same physical and circuit switched signaling resources. Inside the IP telephony network (i.e., the path NW-GW, GK, RA-GW for an external call or RA-GW, GK, RA-GW for an internal call), these non-idle transactions are each signaled in a separate connection according to the IP telephony, (e.g., H.225.0) call control standard using unique Call IDs.

The present invention is also applicable to a case where the addressing of the MS is required. According to, for example, mobile (cellular) systems (e.g., GSM), the initial circuit switched signaling connection is always established from the MS towards the IP telephony network (eventually to the MSC).

In mobile originated (MO) transactions the above described procedure is acceptable. The MS accesses the Base Transceiver Station (BTS). Then the MS initiates connection establishment by sending a service request message (e.g., GSM 04.08 CM service Request).

An almost identical procedure is conducted in mobile terminated (MT) transactions. However, the procedure begins with paging the MS instead of sending a Service Request message for the MS. The MS answers the paging with a Paging Response message.

Thus, regardless of whether the actual transaction is a MO or MT transaction, the circuit switched connection is established from the MS towards the MSC and at the same time the initial message is relayed to the MSC. Note that every possible initial message (e.g., Service Request, Paging Response) contains mobile identity.

Inside the IP telephony network, the initial message is forwarded through the IP telephony network from the RA-GW to the GK. If the call is external the message is further forwarded to an Network Gateway (NW-GW) and then the MSC. Note that the IP telephony call control signaling connection is not set up during the transmission of this initial message, but is setup later when the mobile protocol SETUP message is transmitted. Since the SETUP message does not necessarily contain any mobile identify, due to the circuit switched nature of the connection, some means must be provided to set up the IP telephony call control connection towards the correct RA-GW. Also, some means must be provided for the RA-GW, to map the IP telephony call control connection to the correct circuit switched (e.g., LAPD) dedicated connection to the addressed MS.

To achieve the above, the RA-GW, upon reception of the initial mobile system protocol message such as a GSM layer 3 message from the BTS, stores the mobile identity included in the initial mobile system protocol message and maps the mobile identity to the circuit switched connection that is established for the MS. Then the RA-GW sends the encapsulated initial mobile system protocol message to the GK inside a message such as an IP communication. This message shall also include the mobile identity.

The present invention suggests the mobile identity being provided as the session identifier. A session here means all the transactions that a MS participates in during the period it leaves the idle state and returns back to it.

The GK, upon reception of a valid IP communication containing the encapsulated initial mobile system protocol message, stores the session identity in order to later be able to forward further messages to the correct RA-GW. The GK obviously has to know which areas (cells) belong to which RA-GW. What happens next depends on whether this transaction is an internal (GK-controlled) or external (MSC-controlled) procedure. The following focuses on the external case. The internal case basically includes two GK-RA-GW legs, or just one leg if the other part is towards a conventional IP telephony terminal configured according to the H.323 standard. Thus, the internal case is easy to understand once the external call case has been described.

The GK forwards the initial mobile system protocol message to the NW-GW that also has to store the mobile identity. The NW-GW then establishes a circuit switched connection towards the MSC and sends the encapsulated initial mobile system protocol message to the MSC. The NW-GW maps the mobile identity to the new circuit switched connection. Now a situation exists where the signaling connections, are mapped to the same mobile identity at both interfaces.

Usually after establishing the circuit switched connection and transmitting the initial mobile system protocol messages, some non-call control procedures, for example, authentication, ciphering mode setting are performed. The mobile system protocol messages for these procedures are signaled over the IP telephony network and tunneled inside the IP telephony protocol messages. In circuit switched connection interfaces these messages are transmitted over the previously established dedicated layer 2 connections. Therefore, when the NW-GW receives one of these messages which, could for example be GSM messages, the NW-GW shall check the GSM messages to determine information of how the corresponding layer 2 SCCP connection is mapped to the mobile identity and LAI. The NW-GW then adds the information, including the mobile identity and LAI, to the message. Thus, the GK knows to which RA-GW to forward the message. Also the RA-GW knows to which LAPD connection to further forward the tunneled message which could, for example, be a GSM message. The same obviously applies in the opposite direction for messages transmitted from the RA-GW to the NW-GW.

At some point the MS or the)MSC may start the actual call signaling. Call control messages, such as SETUP, ALERTING, CONNECT, etc., all include an information of a TI. The TI is used to distinguish between messages belonging to different calls that use the same connections (e.g., GSM layer 2, LAPD & SCCP). Thus, different simultaneous calls can occur to/from the same MS. Inside the IP telephony network, for each new call, a new IP telephony call control (e.g., Q931 used here as an example) connection is established. Therefore, the same connections (e.g., GSM layer 2, LAPD & SCCP) can contain messages for several call transactions that each must be "forwarded" to the correct Q931 connection according to the TI values. This means that every time a NW-GW or RA-GW starts to establish a new Q931 connection due to having received a SETUP message (e.g., GSM), they must store the TI and map it to the new Q931 connection. Also, the NW-GW must add a session identifier (e.g., mobile identity) to the Q931 setup message in order for the other end (and the GK) to know for which MS, namely for which layer 2 connection, the Q931 connection is being established.

Now, when the NW-GW receives a new Q931 setup message, it checks the mobile identity and looks for the corresponding (e.g., GSM layer 2) connection from the mapping table. Then the NW-GW extracts the mobile signaling message (e.g., GSM message) from the Q931 message, stores the TI and maps it to the mobile identity and the Q931 connection that is being established. Thus, there will be mapping that ties together mobile identity, TI and Q931 connection. Also the correct (e.g., GSM layer 2) connection is addressed. Therefore, every time the NW-GW receives a call control message from its interface (e.g., GSM, SCCP), it will first check how that connection and TI is mapped to the Q931 connection, and then forward the message to the i, correct connection. Note that once the Q931 connection is established, there is no need to add the session identifier (e.g., mobile identity) to Q931 messages.

However, the session identifier must be included in Q931 setup messages. In the opposite direction, the Call ID of the Q931 connection from which the message was received, provides enough information to dispatch the tunneled message to the correct connection.

Some of the simultaneous call control procedures may be internal, GK-controlled, while others are external, MSC-controlled. Since the IP telephony network cannot control the TI allocation of the MSC and the MSC is not aware of the allocations done by the GK for the internal calls, there is always a danger of clashing TIs. In other words, there may be an active internal call for which the GK has allocated, for the MT leg of that call, a TI of 1. Now if the MSC wants to start a new MT call establishment for that same MS, there is the possibility that it may allocate a TI of 1. Therefore, the GK must be able to change the TI value in such a way that the MSC does not notice the change. This means that in the GK there must be two TI-to-Call ID mappings for each Q931 connection. In the external call case, one for RA-GW$_1$-GK leg and another for NW-GW-GK leg. In the internal call case, one for RA-GW$_1$-GK leg and another for RA-GW$_2$-GK leg.

It should be noted that if the GK has to change the TI mapping for the external call, then the handover for that external call cannot be made from the IP telephony network towards the external network. This is because after the handover the MSC would think that the call has TI=x while the MS "sees" the same call as having TI=y.

Thus, by use of the method and apparatus of the present invention as described above, it is possible to establish mobile cellular system (e.g., GSM) calls over the IP telephony network regardless of the current state of the MS. Therefore, the present invention permits the MS to establish mobile cellular system calls over the IP telephony network regardless of whether the MS already has active calls established or not. The present invention also solves the problem of clashing TI values and shows how to map circuit switched connectivity and TI based GSM signaling to Q931 based IP telephony network signaling.

To further explain the features of the present invention, described below are procedures conducted by the present invention with respect to various situations. Particularly, the present invention is described below relative to situations where first, an external MT call is established with initial paging with a MS. Then another internal MS establishes a call to the same MS. This situation includes call waiting service and holding of the external call. Finally, a new external transaction having the same TI as the internal call is initiated.

Figure 1:
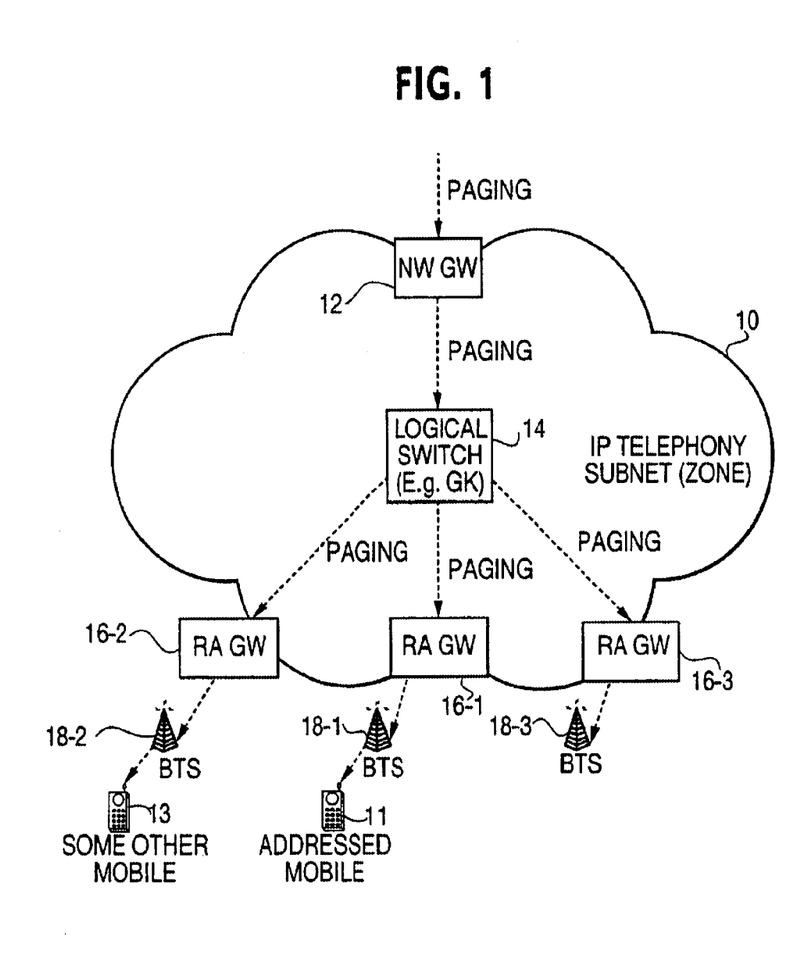
FIG. 1 illustrates the paging phase of the present invention where a first external mobile terminated (MT) call is established with initial paging.

According to the present invention, the above described situation begins where a MSC (not shown) starts the first transaction by paging a MS$_1$ 11. As illustrated in FIG. 1 in a sub-network (zone) 10 of an IP telephony network, a paging message, containing mobile identity of an addressed MS$_1$ 11 (e.g., GSM IMSI and TMSI), a list of cells in which to perform the paging, and optionally the information identifying the needed channel, is sent to an NW-GW 12 using a circuit switched connection (e.g., SCCP). The NW-GW 12 then forwards the paging message to a GK 14 inside an IP communication paging request message. It should be noted that no IP telephony call control (e.g., Q931) connection is established at this point between the NW-GW 12 and the GK 14.

The GK 14 then multicasts the IP communication paging request message, and the paging message included therein, to all RA-GWs 16-1 through 16-3 registered to the GK 14. It should be noted that here it is assumed that there is one-to-one mapping between a GK 14 and the sub-network 10 and that there is no internal connection being conducted for the addressed MS$_1$ 11 that the GK 14 is aware of. If there was such an internal connection, the GK 14 could construct a paging response message by itself and send it back to the NW-GW 12 and the MSC. The RA-GWs 16-1 through 16-3 then convert paging messages into paging command messages and send them to their BTSs 18-1 through 18-3 using connectionless LAPD service. The BTSs 18-1 through 18-3 convert the paging command messages into wireless paging request messages that are broadcasted on the paging channel.

All idle MSs are required to constantly monitor the paging channel and therefore the addressed MS$_1$ 11 will receive the wireless paging request message and notice that it is indeed the MS$_1$ 11 is being paged. The MS$_1$ 11 accesses the sub-network 10 through a random access procedure. The sub-network 10 then establishes, for example, a LAPD connection, a dedicated sub-timeslot, between the RA-GW$_1$ 16-1 and the BTS$_1$ 18-1, for the MS$_1$ 11 and assigns a dedicated air-interface signaling channel (e.g., SDCCH).

Figure 2:
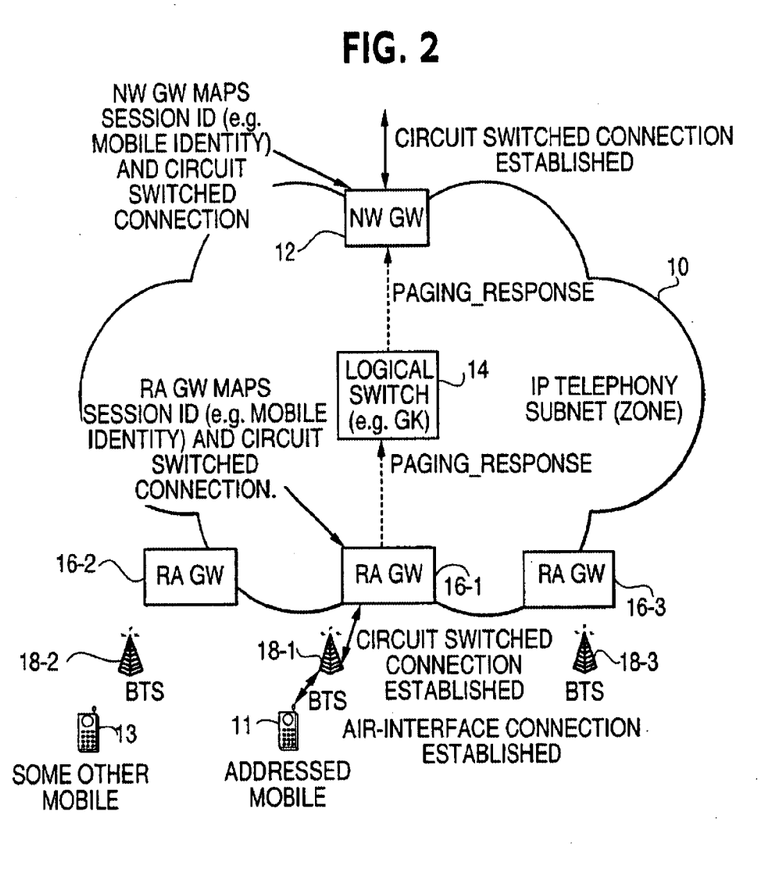
FIG. 2 illustrates the paging response and establishment of datalink connections phase of the present invention where a first external MT call is established with initial paging.

Thereafter, as illustrated in FIG. 2 the MS$_1$ 11 can establish air-interface datalink connection by sending, for example, a layer 2 SABM message containing a wireless paging response message. The BTS$_1$ 18-1 informs the RA-GW$_1$ 16-1 of the establishment of the air-interface connection by sending an establish indication message containing the wireless paging response message it received from the MS$_1$ 11.

The wireless paging response message contains, among other things, an information element which includes a mobile identity. Since there needs to be a way to map the actual MS to the Q931 connection(s) that will be established, it is important that the RA-GW$_1$ 16-1 store a session identifier (e.g., the mobile identity of the MS$_1$) for the MS$_1$, and map the session identifier with the previously established air-interface connection. The wireless paging response message is encapsulated inside an IP communication paging response message and forwarded back to the GK 14. The GK 14 also stores the session identifier and updates the location information of the MS$_1$ 11. The GK 14 further forwards the IP communication paging response message to the NW-GW 12. The NW-GW 12 then establishes a connection such as a layer 2 SCCP connection towards the MSC and sends a message containing the paging response message to the MSC. The NW-GW 12 also stores the session identifier and maps it to the SCCP connection, namely the dedicated sub-timeslot between the NW-GW 12 and the MSC, just established.

Now a situation exists where there are already signaling connections (timeslots) both in Abis-, (air), and A-interfaces. Also these connections are mapped to the same mobile session identifier at both interfaces. However, at this point, there is no Q931 connection inside the sub-network 10.

Figure 3:
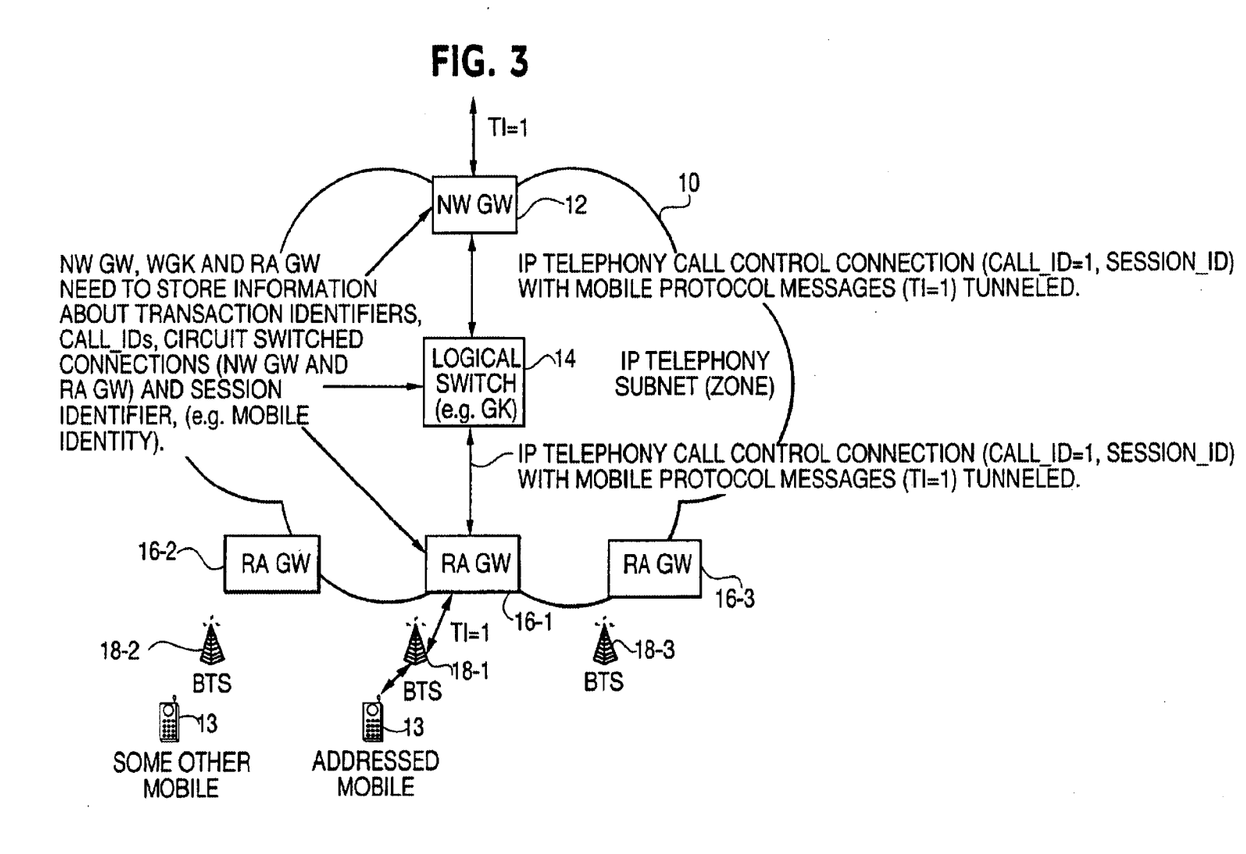
FIG. 3 illustrates processing of the present invention after a first connection has been established.

Before the actual call establishment such as that illustrated in FIG. 3, a couple of procedures such as authentication and ciphering mode setting, are usually performed. These procedures are signaled using the previously established SCCP and LAPD/LAPDm connections outside the IP telephony sub-network 10.

The MSC starts the call establishment by sending a setup message to the NW-GW 12 using the previously established SCCP connection. The setup message contains a field for a TI that is used to distinguish between several simultaneous transactions (e.g. two calls) per an MS. For this situation, it is assumed that the TI field of the setup message has TI=1. Another important field of the setup message is a protocol discriminator (PD) that is used to distinguish between mobility management (MM), radio resource (RR) management, normal call control (CC), SMS and call-independent supplementary services (SS) control. Since this message is a call setup message, the PD indicates call control.

To effect call establishment as illustrated in FIG. 3, the NW-GW 12 starts to establish a Q931 connection towards the GK 14. The NW-GW 12 sends a Q931 setup message (IP communication) containing a Call ID value it generated towards the RA-GW$_1$. For simplicity with respect to this situation it is assumed that the Call ID=1. The NW-GW 12, the GK 14, and the RA-GW$_1$ 16-1 each needs to map the Q931 connection to the transaction that is using the SCCP connection. At the very least a table is provided in the NW-GW 12 and in each of the GK 14 and the RA-GW$_1$ 16-1, so that each table contains the session identifier (e.g., the mobile identity (TMSI)), PD and TI pair, corresponding SCCP timeslot information, and Call ID of the Q931 connection. The Q931 setup message also contains the session identifier, because the mobile protocol setup message does not necessarily contain called party identity.

Thus, based on the above, the Q931 connections between the NW-GW 12, GK 14, and the RA-GW$_1$ 16-1 are established using the same Call ID=1. The mobile cellular system (e.g., GSM) messages, included in the Q931 messages, use TI=1 for both the NW-GW 12 and GK 14, and the GK 14 and RA-GW$_1$ 16-1 legs. Outside the sub-network 10, the previously established circuit switched (SCCP and LAPD/LAPDm) connections (timesiots) are used.

Figure 4:
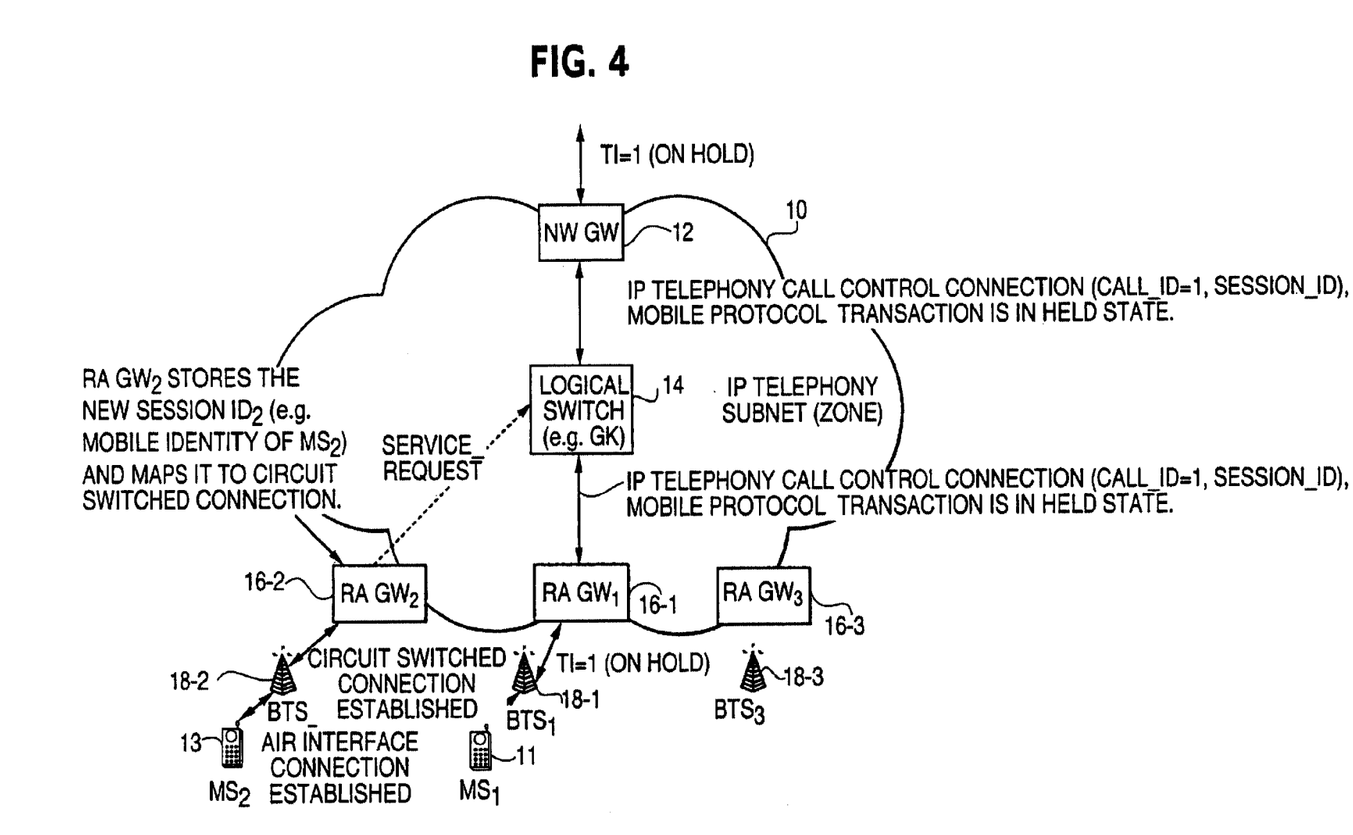
FIG. 4 illustrates processing of the present invention when a second MS initiates call establishment by requesting service.

Now, as illustrated in FIG. 4, it is assumed that an internal MS$_2$ 13 begins establishing a call to the MS$_1$ 11 to which the external call to the MS$_1$ 11 was made as described above. To simplify this situation, it is assumed as illustrated in FIG. 4, that the external call is put on hold and the MS$_1$ 11 is ready to accept, make active, the internal call. Otherwise, there would be call waiting prior to holding the original call and accepting the new one. First the radio signaling channel (e.g., SDCCH) is assigned to the MS$_2$ 13 the same way it was done for the MS$_1$ 11 as described above. At that point the LAPD layer 2 connection (timeslot) between RA-GW$_2$ 16-2 and the BTS$_2$ 18-2 is established. The MS$_2$ 13 then establishes an air-interface connection by sending, for example, a SABM message containing a service request message. This message contains the same kind of mobile identity field as the wireless paging response message. The RA-GW$_2$ 16-2 stores a session identifier (e.g., the mobile identity) and maps it to the LAPD connection. The service request message, encapsulated inside message, is then forwarded to the GK 14 inside an IP communication message.

Thus, as a result of the above the MS$_2$ 13 initiates call establishment by requesting service. The GK 14 accepts the service request either by sending back an IP communication service accept message or by performing authentication (optional) and ciphering setting procedures. In either case, the needed signalling messages are transferred using IP communication, without opening a Q931 connection.

Figure 5:
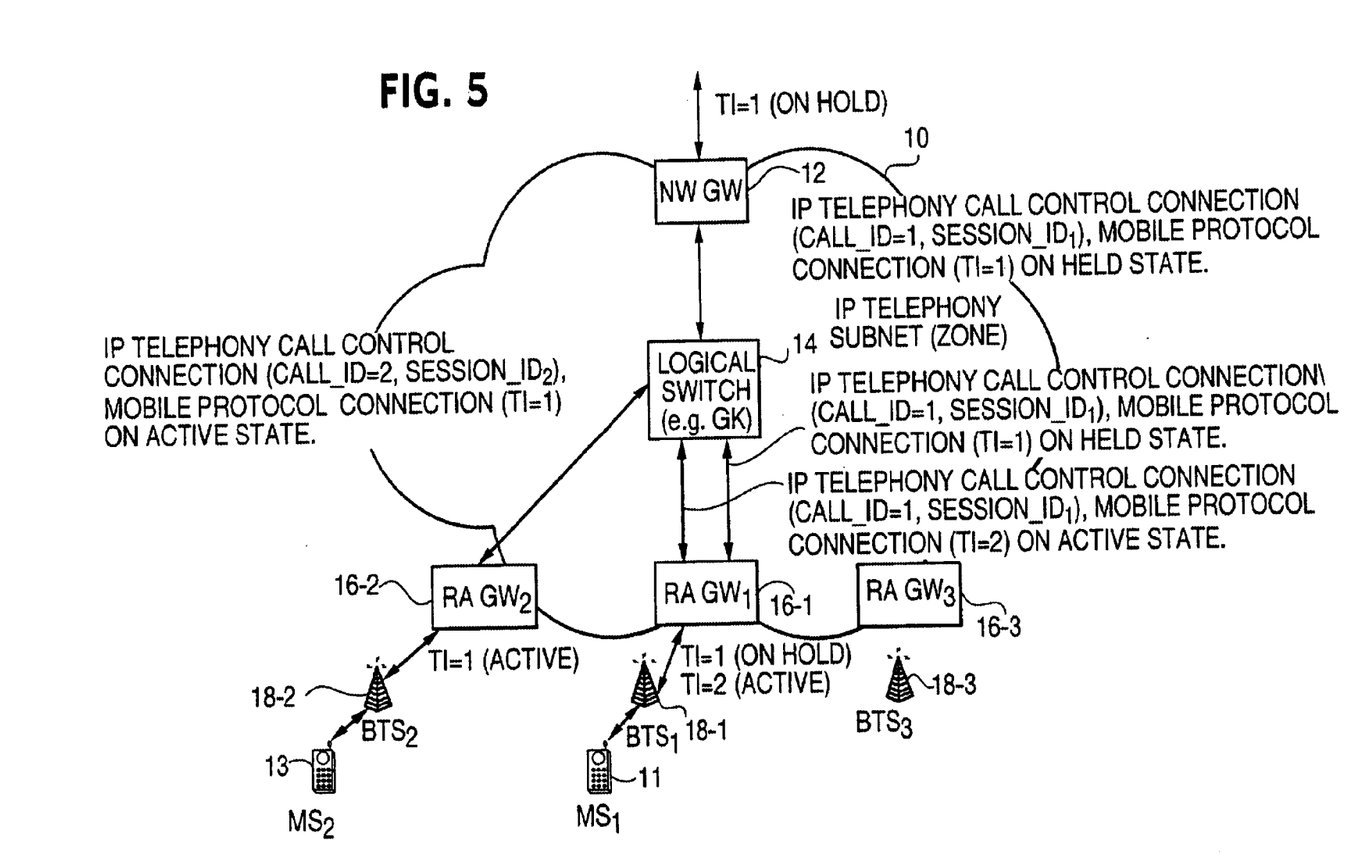
FIG. 5 illustrates processing of the present invention when one internal (active) transaction and one external (held) transaction are established.

Next the MS$_2$ 13 starts the actual transaction by sending a setup message. It is assumed that the MS$_2$ 13 uses the same transaction identifier, TI=1, that is already used for MS$_1$ 11 external transaction. The Q931 connections to be established for the RA-GW$_2$-GK and GK-RA-GW$_1$ legs are normally provided with a unique Call ID, for example, Call ID=2. It should be noted that H.323 standard Call IDs are always unique, therefore there is no need to be concerned about clashes. However, the GK 14 has to change the TI of the new transaction for the GK-RA-GW$_2$ leg. Otherwise there would be two transactions for the MS$_1$ 11 using the same TI, TI=1. Assuming, for example, that the GK 14 allocated a new TI value, TI=2, for the MS$_1$ 11 terminated part of the transaction, the MS$_2$ 13 side can still use TI=1. Also the GK 14 has to change the session identifier field from session-id$_1$ to session-id$_2$. FIG. 5 depicts the situation after the second call has been established.

Figure 6:
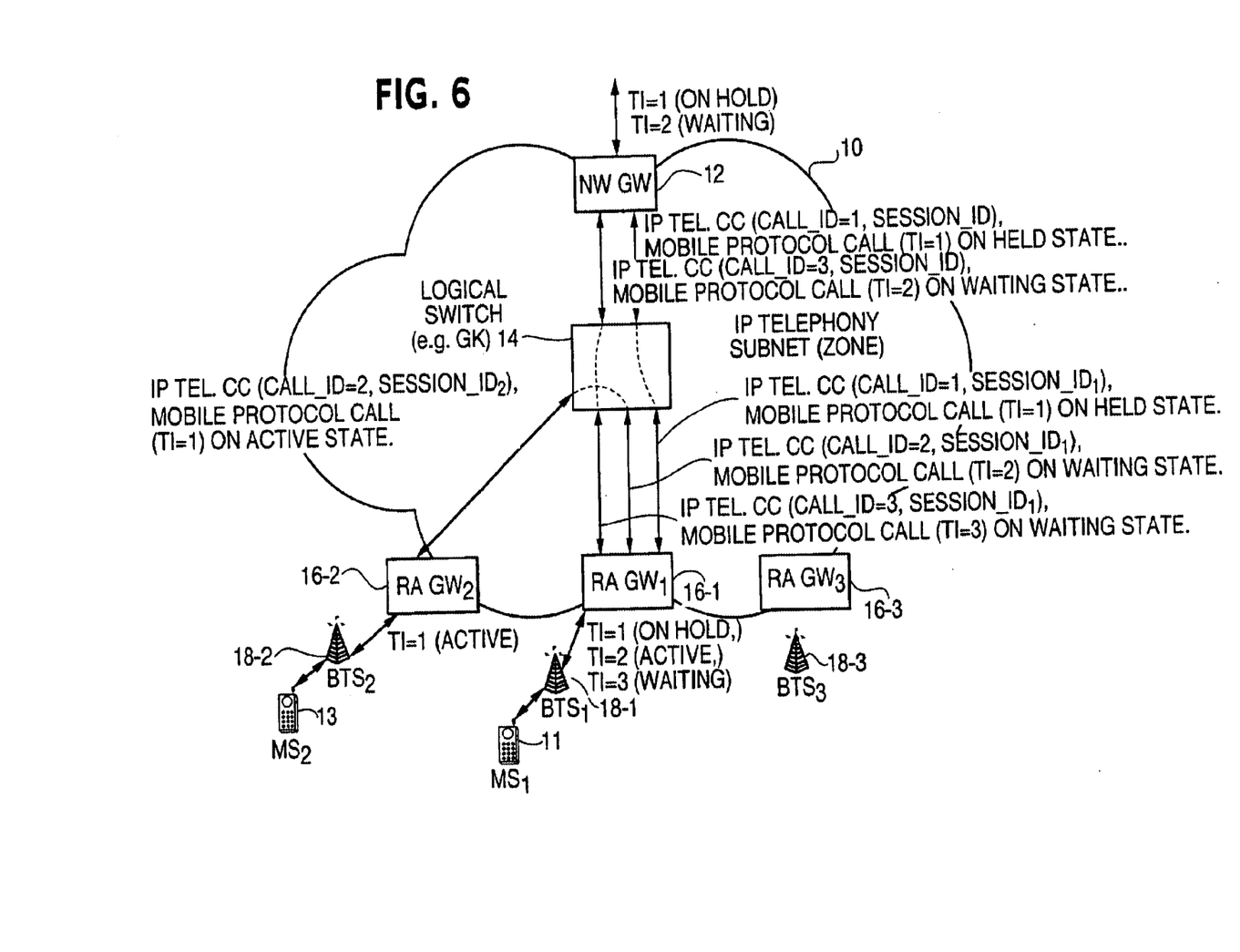
FIG. 6 illustrates processing of the present invention when one internal (active) transaction and two external (held, waiting) transactions are established.

To add another step to the above situation, it is assumed as illustrated in FIG. 6, yet another MT external call coming from the MSC is to be established. This third call will end up being placed in the call waiting state. The setup message for this third call makes use of, for example, TI=2, since the MSC knows that TI=1 is already reserved for the first call. However, the MSC is not aware of the second call that is using the same TI=2 value. Again the GK 14 has to map TI values. It is Assumed that the GK 14 changes TI=2 to TI=3 for the third call's GK 14-RA-GW$_1$ 16-1, leg. The Q931 connection Call ID for the third call will naturally have a unique value, Call ID=3. The session identifier is the same as the first call's end-to-end. The tables of NW-GW 12, GK 14 and RA-GW$_1$ 16-1, will have this new entry with a new TI value.

Alternatively to the procedure of the present invention described above where a new Q931 signaling connection is opened per transaction, the present invention also provides a procedure where only one Q931 signaling connection is established per active MS regardless of the number of non-idle call control transactions the MS is involved in.

Figure 7:
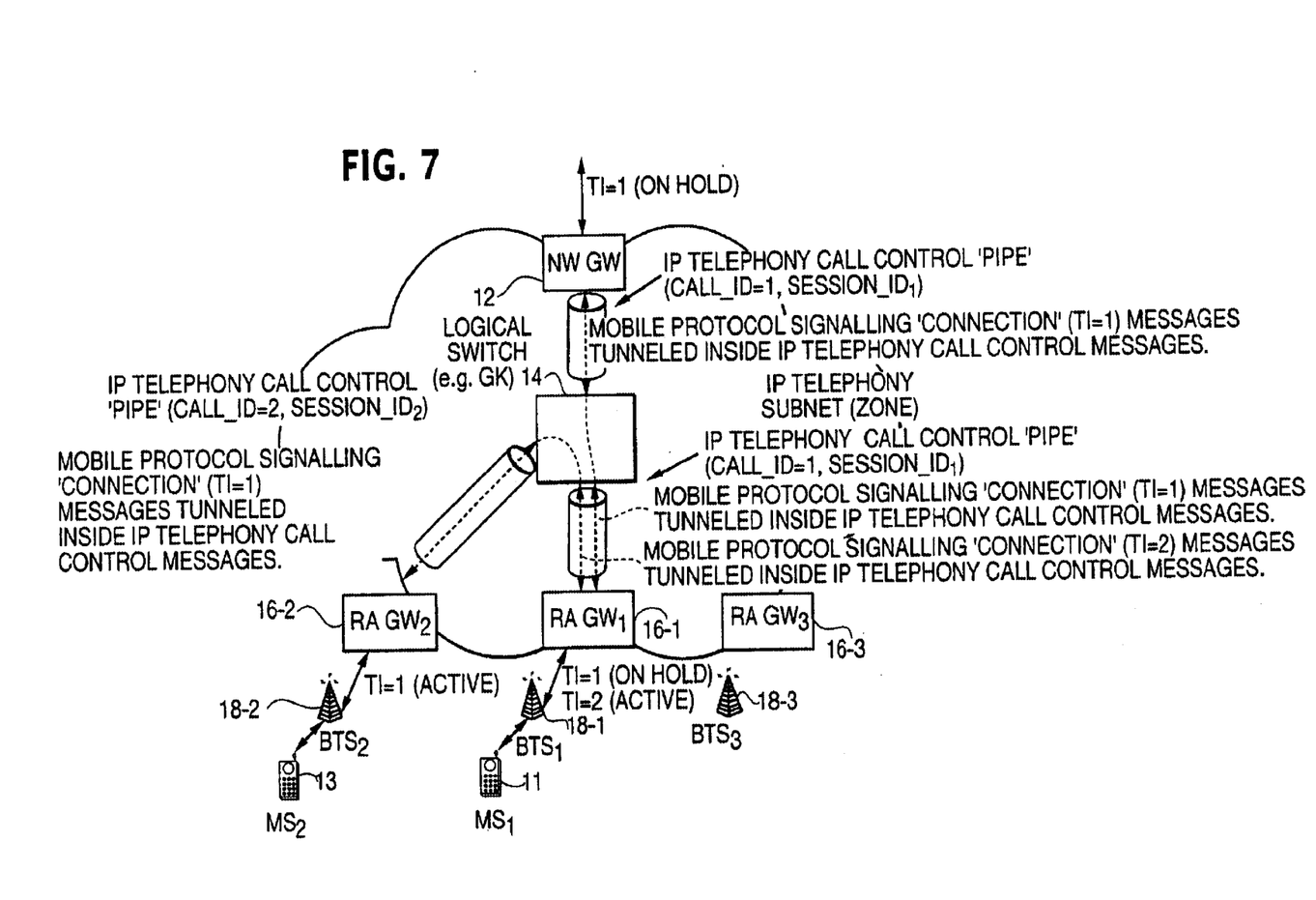
FIG. 7 illustrates alternative processing of the present invention for permitting mobile communications over IP networks.

According to the alternative procedure of the present invention, each simultaneous call control transaction belonging to the same MS is signaled using the same Q931 signaling connection inside the sub-network 10 as illustrated in FIG. 7. This alternative procedure of the present invention will be described with respect to a case where there is more than one non-idle transaction (each having a separate TI) being conducted for the same MS, and the Q931 signaling communications are signaled using the same physical and layer 2 signaling resources. Inside the sub-network 10, where the path NW-GW 12<->GK 14<->RA-GW$_1$ 16-1 for external call or RA-GW$_2$ 16-2<->GK 14<->RA-GW1 16-1 are signaled using the same Q931 connection.

According to the alternative procedure of the present invention, at some point the MS or the MSC may start the actual call signaling.

Inside the sub-network 10 every transaction that uses the same circuit switched resources (i.e., the SCCP/LAPD timeslot assigned to a particular MS) is transmitted inside the same Q931 connection. Therefore, in a multiple transaction case, several transactions are signaled over one Q931 connection. The mapping between mobile system (e.g., GSM) and H.323 networks is simple since the concern here is to map correctly the circuit switched (e.g., GSM) connections to the correct Q931 connections regardless of the TI values. Thus, in practice, the NW-GW 12 performs the following functions. Whenever a message is received from a Q931 connection, the NW-GW 12 examines its mapping table and forwards the tunneled GSM message to a corresponding circuit switched connection. The opposite occurs in the opposite direction. Whenever the NW-GW 12 receives a message from a circuit switched connection interface, except a first message which is handled as described above, the NW-GW 12 forwards it to the correct Q931 connection.

The GK 14 has an additional mapping between the Call IDs of different legs of the same end-to-end Q931 connection. Such is illustrated in FIG. 7 which depicts a case where there is an external and an internal call being conducted. The external call has been established first and both of its Q931 legs (NW-GW-GK, GK-RA-GW$_1$) use the same Call ID=1. Real Call IDs are 128-bit values. Thus, the value of 1 is given as an example. The internal call is established later. The GK 14-RA-GW$_1$ 16-1 leg of the internal call will use the same Q931 signaling connection as the external call, because both of these call transactions share the same circuit switched connection towards the MS$_1$ 11. However, the other leg of the internal call between the RA-GW$_2$ 16-2 and the GK 14 use a different Call ID, such as Call ID=2. Thus, in order to be able to transmit GK routed signaling messages between RA-GW$_1$ 16-1 and RA-GW$_2$ 16-2, there must be a way to map these call IDs and their corresponding Q931 signaling connections to each other.

In order to accomplish the above described Call ID to Call ID mapping according to this alternative procedure of the present invention, the GK 14 looks into the tunneled messages. Those messages contain the TIs, which are used to make the dispatching decision at the GK 14. Specifically, these TIs are used to determine whether to forward the messages received from the RA-GW$_1$ 16-1 to the RA-GW$_2$ 16-2 or the NW-GW 12.

The GK 14 has to be able to reallocate TI values. Consider a case where an external MT call is being established during an active or held internal MT call. It is assumed that the internal call is using TI=1. The MSC may start call establishment using the very same TI value, since it is unaware of the internal call. The GK 14 changes the TI value of the external call in such a way that the MSC does not see the change. Specifically, the GK 14 uses TI=1 for the tunneled GSM messages on the NW-GW 12-GK 14 leg and some other value, determined by the GK 14, for the GK-RA-GW$_1$ leg. It should be noted that if the GK 14 has to change the TI mapping for the external call, then the handover for that external call cannot be made from the sub-network 10 towards an external network. This is because after the handover the MSC would think that the call has TI=x while the MS "sees" the same call as having TI=y.

The present invention further reduces the likelihood of TI clashes by using the highest unused values for the TI. For example, the TI value field in GSM is 3 bits long. Thus, there are 7 possible TI values (0 . . . 6). Usually the MSCs assign TI values from the lowest available TI values. Therefore, it is unlikely that TI values greater than 3 are used. The present invention causes the GK to allocate the TI values using always the highest unused values. However, since there may be MSC implementations that allocate TIs differently then stated above, the TI allocation procedures of the GK for internal call transactions is made to be flexibility configured. At least the following two configurations should be supported, with the first one set as a default configuration: 1) always use the highest available unused value as the TI value; and 2) always use the lowest available value as the TI.

Thus according to the above, the present invention provides a method and apparatus for permitting mobile communications between a MSC and a MS and between MSs by establishing for each transaction including a call on an Internet Protocol (IP) connection in an IP network. The present invention is not limited to cases where the first transaction is a mobile terminated external call. Other types of transactions being the first transaction can initiate the procedures of the present invention.

In the invention, for example, regarding a MT call as the first transaction, a call to a MS is initiated by sending from the MSC to the MS, via the IP network, a call initiation (paging) message causing the MS to send a response message to the MSC. The response message includes a mobile identity which identifies the MS and which can therefore be used as session identifier. Responsive to the response message, the MSC sends to the MS a call set up message that triggers establishment of an IP connection in the IP network upon which a transaction including the call is to be conducted. The call set up message includes a transaction ID which identifies the transaction. The IP network stores the transaction ID from the call setup message, and maps the transaction ID with respect to the session identifier (e.g., the mobile identity) and the IP connection to be established. The IP connection is established in the IP network according to data stored and mapped in the IP network, thereby permitting mobile communications between the MSC and the MS over the IP network. Another call to the MS from another MS while the previous call is active is handled by establishing another IP telephony signaling connection in the IP network for the other call and mapping a different value for the transaction ID for the other call with respect to the session identifier (e.g., the mobile identity) of the other MS and a second leg of the other IP connection to be established between said IP network and the MS in a manner to avoid clashes with the previously mapped transaction ID While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of permitting mobile communications between a Mobile Switching Center (MSC) and a Mobile Station (MS) and between MSs by establishing for each transaction including a call an Internet Protocol (IP) connection in an IP network which includes a Gateway (GW), coupled to said MSC, for translating between said IP network and a circuit switched network, a Gatekeeper (GK), coupled to said GW, for performing call control functions, and a plurality of Internet Mobile Clusters (IMCs), each effecting wireless communications with said MSs via a Base Transceiver Station (BTS), said method comprising:

initiating a call to a MS by sending from said MSC to said MS, via said GW, GK, IMCs, and BTSs, a call initiation message causing said MS to send a response message to an IMC via a BTS, said response message includes a mobile identity which identifies said MS;

storing in said IMC said mobile identity and mapping said mobile identity with respect to a wireless connection established with said MS via said BTS;

sending a first IP communication including said response message from said IMC to said GK;

storing in said GK said mobile identity from said first IP communication and forwarding said first IP communication to said GW;

storing in said GW said mobile identity from said first IP communication, mapping said mobile identity with respect to a wireline connection established with said MSC and forwarding said response message from said first IP communication to said MSC;

responsive to said response message, sending from said MSC to said GW a call set up message to establish an IP connection in said IP network upon which a transaction including said call is to be conducted, said call set up message including a transaction ID which identifies said transaction;

storing in said GW said transaction ID from said call setup message, mapping said transaction ID with respect to said mobile identity, said wireline connection and said IP connection to be established, and sending a second IP communication including said call setup message from said GW to said GK;

storing in said GK said transaction ID from said second IP communication including said call setup message, mapping said transaction ID with respect to said mobile identity and said IP connection to be established, and forwarding said second IP communication from said GK to said IMC;

storing in said IMC said transaction ID from said second IP communication including said call setup message, mapping said transaction ID with respect to said mobile identity, said wireless connection and said IP connection to be established; and establishing said IP connection in said IP network according to data stored and mapped in each of said GW, GK and IMC, thereby permitting mobile communications between said MSC and said MS over said IP network.

2. A method according to claim 1, further comprising:

initiating another call to said MS from another MS when said call is active by sending from said another MS to another IMC, via another BTS, a service request message including another mobile identity which identifies said another MS;

storing in said another IMC said another mobile identity from said service request message and mapping said another mobile identity with respect to a wireless connection established with said another MS via said another BTS;

sending a third IP communication including said service request message from said IMC to said GK;

storing in said GK said another mobile identity from said third IP communication and in response, sending a fourth IP communication including a service accept message to said another IMC;

receiving in said another IMC said fourth IP communication including said service accept message and forwarding said service accept message to said another MS via said another BTS;

responsive to said service accept message, sending from said another MS to said another IMC a call set up message to establish another IP connection in said IP network upon which another transaction including said another call is to be conducted, said another call set up message including another transaction ID which identifies said another transaction;

storing in said another IMC said another transaction ID from said another call setup message, mapping said another transaction ID with respect to said another mobile identity, said wireless connection and said another IP connection to be established, and sending a fifth IP communication including said call setup message from said another IMC to said GK;

storing in said GK said another transaction ID from said fifth IP communication, mapping said another transaction ID with respect to said another mobile identity and a first leg of said another IP connection to be established between said another IMC and said GK, and mapping a different value for said another transaction ID with respect to said another mobile identity and a second leg of said another IP connection to be established between said GK and said IMC to avoid clashes with said previously mapped transaction ID; and establishing said another IP connection in said IP network according to data stored and mapped in each of said GK and said another IMC, thereby permitting mobile communications between said another MS and said MS over said IP network.

3. A method according to claim 2, wherein said call from said MSC is initiated by sending a paging request message from said GK to each of said IMCs which in turn cause a wireless paging signal to be sent over a paging channel to each of said MSs via said BTSs.

4. A method according to claim 3, wherein each MS monitors said paging channel so that a response message can be sent to an IMC when said wireless paging signal is directed to said MS.

5. A method according to claim 2, wherein said third IP communication includes another location area information (LAI) representing a location of said another MS, said another LAI including information identifying said another IMC.

6. A method according to claim 5, wherein said GK stores said another mobile identity along with said another LAI and maps said another transaction ID with respect to said another mobile identity, said another LAI, and said first and second legs of said another IP connection to be established in a manner to avoid clashes with said previously mapped transaction ID.

7. A method according to claim 2, wherein said different value is chosen for said another transaction ID according to a procedure where a highest unused value for said transaction ID is used.

8. A method according to claim 2, wherein said different value is chosen for said another transaction ID according to a procedure where a lowest unused value for said transaction ID is used.

9. A method according to claim 1, wherein said first IP communication includes location area information (LAI) representing a location of MS, said LAI including information identifying said IMC.

10. A method according to claim 9, wherein said GK stores said mobile identity along with said LAI and maps said transaction ID with respect to said mobile identity, said LAI and said IP connection to be established.

11. A method of permitting mobile communications between a Mobile Switching Center (MSC) and a Mobile Station (MS) and between MSs by establishing for each transaction including a call an Internet Protocol (IP) connection in an IP network, said method comprising:

initiating a call to a MS by sending from said MSC to said MS, via said IP network, a call initiation message causing said MS to send a response message to said MSC, said response message includes a mobile identity which identifies said MS;

responsive to said response message, sending from said MSC to said MS a call set up message to establish an IP connection in said IP network upon which a transaction including said call is to be conducted, said call set up message including a transaction ID which identifies said transaction;

storing in said IP network said transaction ID from said call setup message, and mapping said transaction ID with respect to said mobile identity and said IP connection to be established;

establishing said IP connection in said IP network according to data stored and mapped in said IP network, thereby permitting mobile communications between said MSC and said MS over said IP network;

initiating another call to said MS from another MS when said call is active by sending from said another MS to said IP network a service request message including another mobile identity which identifies said another MS;

storing in said IP network said another mobile identity from said service request message and sending from said IP network to said another MS a service accept message;

responsive to said service accept message, sending from said another MS to said IP network a call set up message to establish another IP connection in said IP network upon which another transaction including said another call is to be conducted, said another call set up message including another transaction ID which identifies said another transaction;

storing in said IP network said another transaction ID from said another call setup message, mapping said another transaction ID with respect to said another mobile identity and a first leg of said another IP connection to be established between said another MS and said IP network, and mapping a different value for said another transaction ID with respect to said another mobile identity and a second leg of said another IP connection to be established between said IP network and said MS to avoid clashes with said previously mapped transaction ID; and establishing said another IP connection in said IP network according to data stored and mapped in said IP network, thereby permitting mobile communications between said another MS and said MS over said IP network.

12. A method according to claim 11, wherein said call is initiated by sending from said IP network to each of said MSs a wireless paging signal over a paging channel.

13. A method according to claim 12, wherein each MS monitors said paging channel so that a response message can be sent when said wireless paging signal is directed to said MS.

14. A method according to claim 11, wherein said response message includes location area information (LAI) representing a location of said MS.

15. A method according to claim 14, wherein said IP network stores said mobile identity along with said LAI and maps said transaction ID with respect to said mobile identity, said LAI and said IP connection to be established.

16. A method according to claim 11, wherein said service request message includes another location area information (LAI) representing a location of said another MS.

17. A method according to claim 16, wherein said IP network stores said another mobile identity along with said another LAI and maps said another transaction ID with respect to said another mobile identity, said another LAI, and said first and second legs of said another IP connection to be established in a manner to avoid clashes with said previously mapped transaction ID.

18. A method according to claim 11, wherein said different value is chosen for said another transaction ID according to a procedure where a highest unused value for said transaction ID is used.

19. A method according to claim 11, wherein said different value is chosen for said another transaction ID according to a procedure where a lowest unused value for said transaction ID is used.

20. A method of permitting mobile communications between a Mobile Services Switching Center (MSC) and a Mobile Station (MS) and between MSs by establishing an Internet Protocol (IP) connection in an IP network on which a plurality of transactions, each including a call, are to be conducted, said method comprising:

initiating a call to a MS by sending from said MSC to said MS, via said IP network, a call initiation message causing said MS to send a response message to said MSC, said response message includes a mobile identity that can be used as a session identifier which identifies said MS;

responsive to said response message, sending from said MSC to said MS a call set up message to establish an IP connection in said IP network upon which a transaction including said call is to be conducted, said call set up message including a transaction ID which identifies said transaction;

storing in said IP network said transaction ID from said call setup message, and mapping said transaction ID with respect to said session identifier and said IP connection to be established;

establishing said IP connection in said IP network according to data stored and mapped in said IP network;

initiating another call to said MS from another MS when said call is active by sending from said another MS to said IP network a service request message including another mobile identity that can be used as a session identifier which identifies said another MS;

storing in said IP network said another session identifier from said service request message and sending from said IP network to said another MS a service accept message;

responsive to said service accept message, sending from said another MS to said IP network another call set up message to conduct at least a portion of said another call over said IP connection previously established in said IP network for said call between said MS and said MSC, said another call set up message including another transaction ID which identifies said another transaction;

storing in said IP network said another transaction ID from said another call setup message, mapping said another transaction ID with respect to said another session identifier and another IP connection to be established between said another MS and said IP network and mapping a different value for said another transaction ID with respect to said another session identifier and another IP connection to be established between said IP network and said another MS to avoid clashes with said previously mapped transaction ID;

establishing said another IP connection in said IP network according to data stored and mapped in said IP network; and conducting at least a portion of said another call along with said call over said IP connection previously established in said IP network for said call between said MS and said MSC.

\* \* \* \* \*